(12) United States Patent
Kim et al.

(10) Patent No.: US 11,518,263 B2
(45) Date of Patent: Dec. 6, 2022

(54) POWER SUPPLY DEVICE SUPPLYING POWER TO MULTIPLE CARTS, CART, AND METHOD FOR CHARGING CART

(71) Applicant: LG ELECTRONICS INC., Seoul (KR)

(72) Inventors: Sunryang Kim, Seoul (KR); Keunsik No, Seoul (KR); Jaecheon Sa, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 265 days.

(21) Appl. No.: 16/742,358

(22) Filed: Jan. 14, 2020

(65) Prior Publication Data

US 2020/0254895 A1    Aug. 13, 2020

(30) Foreign Application Priority Data

Feb. 8, 2019   (WO) ................ PCT/KR2019/001583
Nov. 5, 2019   (KR) ......................... 10-2019-0140434

(51) Int. Cl.
| | |
|---|---|
| *H02J 7/00* | (2006.01) |
| *B60L 53/62* | (2019.01) |
| *B60L 53/16* | (2019.01) |
| *B62B 3/14* | (2006.01) |
| *B62B 5/00* | (2006.01) |

(52) U.S. Cl.
CPC ............. *B60L 53/62* (2019.02); *B60L 53/16* (2019.02); *B62B 3/14* (2013.01); *B62B 5/0056* (2013.01); *H02J 7/0013* (2013.01); *H02J 7/00032* (2020.01); *H02J 7/0045* (2013.01); *H02J 7/0047* (2013.01); *H02J 7/0071* (2020.01); *B60L 2200/30* (2013.01)

(58) Field of Classification Search
USPC ........ 320/106, 107, 108, 109, 110, 112, 134
See application file for complete search history.

(56) References Cited

U.S. PATENT DOCUMENTS

| | | |
|---|---|---|
| 2006/0254861 A1 | 11/2006 | Perrier et al. |
| 2006/0264120 A1 | 11/2006 | Perrier et al. |
| 2011/0246252 A1 | 10/2011 | Uesugi |
| 2012/0277927 A1 | 11/2012 | Watkins et al. |
| 2014/0152099 A1* | 6/2014 | Boyd ................... H02J 9/04 320/134 |
| 2014/0210267 A1 | 7/2014 | Ishida et al. |
| 2014/0214224 A1 | 7/2014 | Watkins et al. |
| 2014/0266046 A1 | 9/2014 | Baxter et al. |
| 2015/0349557 A1 | 12/2015 | Chen et al. |

(Continued)

FOREIGN PATENT DOCUMENTS

| | | |
|---|---|---|
| EP | 1 153 816 A1 | 11/2001 |
| EP | 2 793 350 A1 | 10/2014 |
| JP | 2001-334940 A | 12/2001 |

(Continued)

*Primary Examiner* — Brian Ngo
(74) *Attorney, Agent, or Firm* — Birch, Stewart, Kolasch & Birch, LLP

(57) ABSTRACT

A power supply device that supplies power to multiple carts, a cart, and a method for charging such cart are provided. According to an embodiment of the present disclosure, the power supply device that supplies the power to the multiple carts calculates charging allocation of carts based on priorities of the carts to control charging of the carts.

16 Claims, 16 Drawing Sheets

(56) References Cited

U.S. PATENT DOCUMENTS

2019/0181671 A1    6/2019   Matsukawa et al.

FOREIGN PATENT DOCUMENTS

| JP | 2017/204130 A1 | 11/2017 | | |
|---|---|---|---|---|
| JP | 6355060 B1 * | 7/2018 | | |
| KR | 10-2011-0100431 A | 9/2011 | | |
| KR | 2011100431 A * | 9/2011 | | |
| WO | WO 2006/117627 A | 11/2006 | | |
| WO | WO 2013/038458 A1 | 3/2013 | | |
| WO | WO-2013163647 A1 * | 10/2013 | ........ | H01M 10/0525 |
| WO | WO 2018/216372 A1 | 11/2018 | | |

* cited by examiner

POWER SUPPLY DEVICE SUPPLYING POWER TO MULTIPLE CARTS, CART, AND METHOD FOR CHARGING CART

CROSS-REFERENCE TO RELATED APPLICATION

This application claims priority under 35 U.S.C. § 119 to and the benefit of PCT/KR2019/001583, filed on Feb. 8, 2019, and Korean Patent Application No. 10-2019-0140434, filed on Nov. 5, 2019, the disclosures of which are incorporated herein by reference in their entirety.

BACKGROUND

1. Technical Field

The present disclosure relates to a power supply device supplying power to multiple carts, a cart, and a method for charging such cart.

2. Description of Related Art

In spaces where human resources and material resources are actively exchanged such as large-scale marts, department stores, airports, and golf courses, various kinds of people may move with various types of objects carried. In this case, devices such as carts may assist users in moving objects, to provide the user with convenience.

In some examples, carts may move based on electrical energy to assist quantity of motion of users. The above configuration may be used for autonomous driving carts or driving assisting carts.

A process of recharging carts after electric energy is used may be required, and various types of techniques are required to be used to efficiently charge multiple carts in a large area.

In particular, various types of charging mechanisms may be required to be used for carts based on space utilization, charging speeds of carts, and a method for charging carts.

The present disclosure proposes a method for efficiently charging a plurality of devices such as carts having mobility.

SUMMARY

In the present disclosure, to solve the above-described problem, one charging device may charge multiple carts so that users use carts at high speed.

The present disclosure also provides a power supply device charging multiple carts at the same time, thereby improving efficiency of space use.

In some examples, in the present disclosure, charging speeds of carts may be variously changed based on states of carts, thereby improving user convenience.

The objects of the present disclosure are not limited to the above-mentioned objects, and the other objects and advantages of the invention, which are not mentioned, can be understood by the following description, and more clearly understood by the embodiments of the present disclosure. It will be also readily understood that the objects and the advantages of the present disclosure may be implemented by features described in appended claims and a combination thereof.

According to an embodiment of the present disclosure, a power supply device that supplies power to multiple carts may calculate charge allocation of carts based on priorities of carts to control charging of the carts.

According to an embodiment of the present disclosure, the power supply device that supplies power to the multiple carts may variously set the charge allocation of carts based on a charge demand, connection sequence information, charging speed of a battery of carts to control the charging of carts.

According to an embodiment of the present disclosure, charging the charger may be controlled based on the information on charge allocation received from the power supply device.

According to an embodiment of the present disclosure, the cart may include a power receiving connector that receives power from a power supply device or another cart and a power transmitting connector that transmits power received at the power receiving connector to another cart.

According to an embodiment of the present disclosure, a method for supplying power to multiple carts may include receiving, by a communicator, information on charge demand from one or more electrically connected carts, calculating, by a controller, charge allocation of carts based on the priorities of the carts, transmitting, by the communicator, to the carts, the information on charge allocation of the carts, and supplying, by a power supplier, power to the physically connected cart.

When embodiments of the present disclosure are applied, multiple carts may be combined to one another and may be charged in a cascade manner.

When embodiments of the present disclosure are applied, it is possible to adjust the charging speed of the carts based on priorities of carts determined in consideration of states of batteries and positions of the multiple carts, or battery properties.

When embodiments of the present disclosure are applied, one power supply device may charge the multiple carts to thereby improve efficiency of charging of carts.

The effect of the present disclosure is not limited to the above-mentioned effect, and those skilled in the art of the present disclosure may easily understand various effects of the present disclosure based on the disclosure of the present disclosure.

DETAILED DESCRIPTION OF EXEMPLARY EMBODIMENTS

Figure 1:
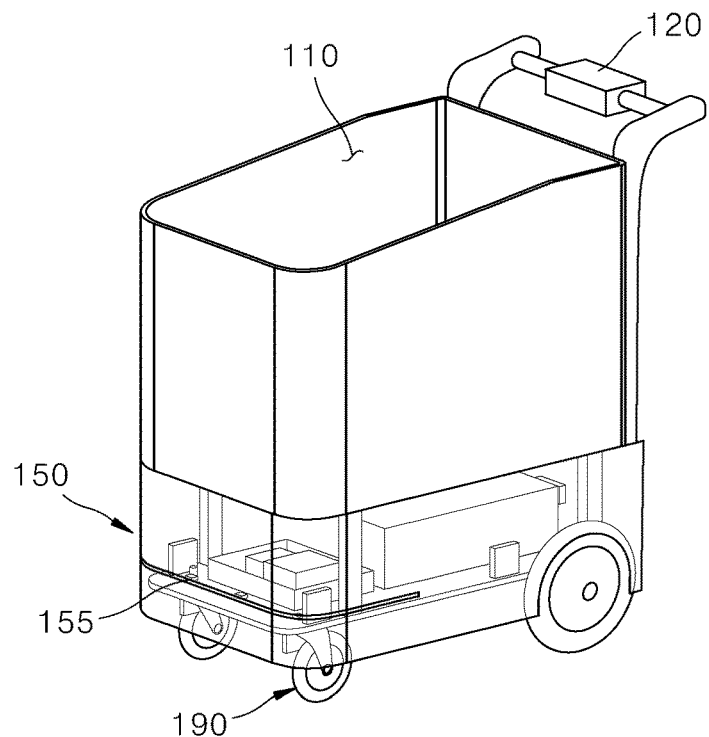
FIG. 1 shows exemplary embodiments of appearance of a cart.

Embodiments of the present disclosure will be described below in detail with reference to the drawings so that those skilled in the art to which the present disclosure pertains may easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the disclosure. Further, some embodiments of the present disclosure will be described in detail with reference to the exemplary drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use terms such as first, second, A, B, (a), and (b), and the like. These terms are only intended to distinguish a component from another component, and a nature, an order, a sequence, or a number of the corresponding components are not limited by that term. When a component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

Further, with respect to embodiment of the present disclosure, the present disclosure may be described by subdividing an individual component, but the components of the present disclosure may be implemented within a device or a module, or a component of the invention may be implemented by being divided into a plurality of devices or modules.

Unless otherwise stated, each component may be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it may be construed terms such as "including" or "comprising" do not include some components or some steps or may include additional components or steps.

In embodying the disclosure, elements can be segmented and described for the purpose of convenience of explanation, these elements may be embodied in one device or module, or one element or may be divided and embodied into two or more devices or modules.

Moving devices that follow the user and move autonomously, or moving devices that move in an assistive manner under the control of users are referred to as "smart carts", "cart-robots", "robots" or "carts" for short. Carts may be used in stores such as large marts and department stores.

Alternatively, carts may be used in spaces with many travelers, such as airports and harbors. Carts may also be used in leisure spaces such as golf courses. In some examples, the cart includes all types of devices that track a position of a user and follow the user and have a predetermined storage space.

The cart also includes a transportation device that transports certain medications or therapeutic equipment in hospitals. The cart also includes devices such as beds used to transport patients. In some examples, the cart includes devices that loads and moves goods to transport the goods in large-sized factories. In one embodiment, robots have a form of a cart, but when it is expanded, robots define a storage space to store objects or include a space where a person may ride or lie down. Thus, the cart includes exemplary embodiments like robot that defines the predetermined storage space and that is controlled by users.

Alternatively, the cart may move based on electric energy with force of pushing or pulling the cart by the user.

That is, according to an embodiment of the present disclosure, a cart includes all types of devices that move autonomously based on charged electrical energy, move semi-autonomously under the control of the user, or move with assistance of power of the user.

According to an embodiment of the present disclosure, a method of charging carts includes supplying power by at least one of power supply devices when carts are electrically connected to one another.

In particular, a power supply device may use a cascade mechanism to supply power to multiple carts. In this method, multiple carts receive power from a power supply device. For example, when carts are connected to each other in series and any one cart is connected to the power supply device, other carts connected to that cart may receive the power from the power supply device.

In some examples, as another example of the method for supplying the power, a parallel mechanism may be used in which two or more carts are disposed in parallel to one power supply device. In this case, one power supply device includes two or more power terminals and supplies power to two or more carts connected in series.

For example, a first terminal of the power supply device is connected with three carts, for example, a first cart-a second cart-a third cart through a cascade mechanism. A second terminal of the same power supply device is connected to four carts, for example, a fourth cart-a fifth cart-a sixth cart-a seventh cart through the cascade mechanism. The power supply device may calculate a charge allocation for each of the seven carts connected to the two terminals.

FIG. 1 shows exemplary embodiments of appearance of a cart.

A cart 100 includes an accommodator 110, a handle assembly 120, a control portion 150, and a mover 190. The accommodator 110 of the cart 100 defines a space where objects are stored or stacked by users. The handle assembly 120 of the cart 100 may be used for the user to control movement of the cart 100 manually or semi-automatically.

The user may push the cart 100 in a forward direction and a rearward direction or may change a direction of the cart 100 using the handle assembly 120. The control portion 150 of the cart 100 controls movement of the cart 100. When the cart moves semi-automatically, the control portion 150 may allow the cart 100 to move based on electric energy in a direction of pushing or pulling the cart by the user.

In some examples, when the cart moves automatically, the control portion 150 controls the movement of the cart 100 so that the cart 100 may move while following the user.

The control portion 150 may control the mover 190. In some examples, positioning sensors may be disposed in various areas of the cart 100 to track a position of a user for following a user. In some examples, an obstacle sensor may be disposed in many areas of the cart 100 to sense peripheral obstacles.

The obstacle sensor may be disposed at a lower end of the cart 100. For example, a plurality of obstacle sensors 220 may be disposed in an area indicated by reference numeral 155 to sense obstacles disposed at a front side/a left side/a right side/a rear side of the cart. In one embodiment, the obstacle sensor may be disposed at a front surface/both sides of the cart in a moving direction of the cart 100. Alternatively, when the cart 100 moves rearward, the obstacle sensor may be disposed on the front surface, a rear surface, and both sides of the cart.

In some examples, a power connector electrically connected to other carts may also be disposed in the cart 100. In one embodiment, the power connector is a connector or a terminal that enables a kind of electrical connection. In some examples, the power connector may be disposed in the accommodator 110 or on an outer surface of the cart 100 according to a method of coupling carts. Alternatively, the power connector may be disposed in an area indicated by reference numeral 155.

A physical location of the power connector may be provided in various ways and logical components of the power connector may be combined with a charger 210 of the control portion 150.

In some examples, a positioning sensor may also be disposed at an upper end or outer sides of the cart 100 to sense the position of the user. Positions or types of the obstacle sensor or the positioning sensor may be variously changed depending on the appearance of the cart and the present disclosure is not limited thereto.

In some examples, the control portion 150 controls the sensors or uses information sensed by the sensors regardless of positions of the sensors. That is, the sensors, the power connectors, and the like are logical components of the control portion 150 regardless of physical positions of the sensors and the power connection.

In some examples, an interface may be disposed in the handle assembly 120 to output predetermined information to users and may also be controlled by the control portion 150.

In some examples, the cart 100 may identify a position of a transmitter that is remotely disposed from the cart 100 and carried by the user and may move while following the cart 100. Alternatively, the cart 100 may identify the position of a fixed type transmitter disposed remotely to thereby identify a current position of the cart 100.

The present disclosure is not limited to the configuration of FIG. 1 and may be variously provided.

Figure 2:
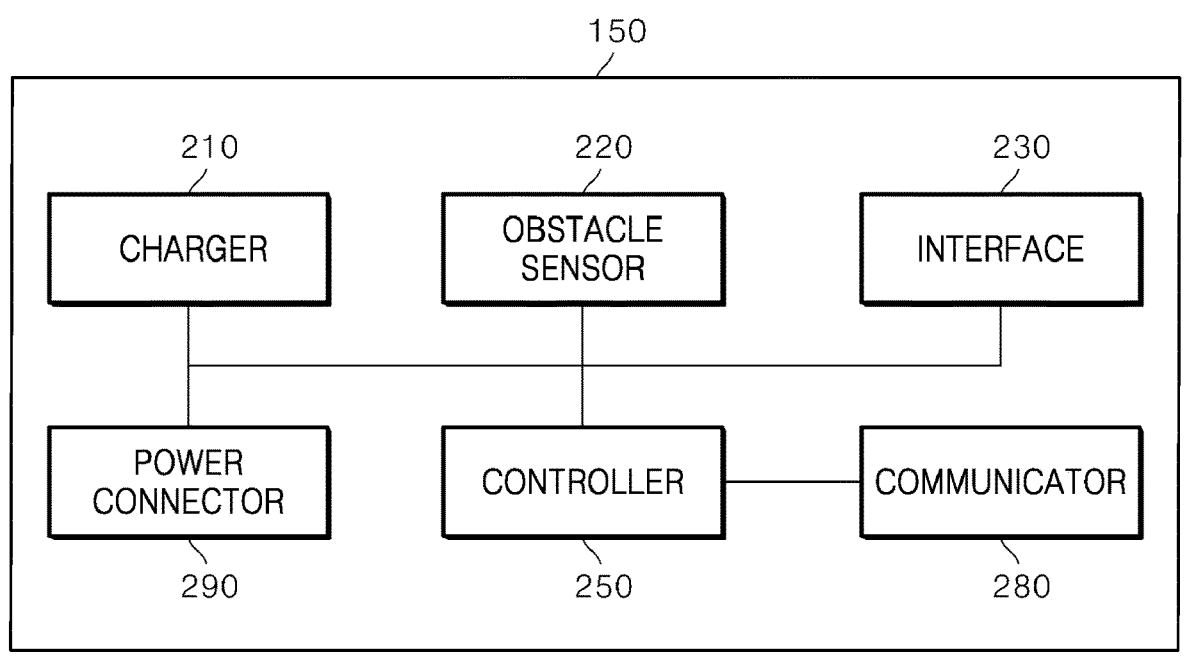
FIG. 2 shows exemplary components of a control portion 150 of a cart 100.

FIG. 2 shows exemplary components of a control portion 150 of a cart 100.

FIG. 2 shows a charger 210, an obstacle sensor 220, an interface 230, a controller 250, a communicator 280, and a power connector 290, which are logical components of a control portion 150.

The charger 210 of the controller 150 includes a battery and accumulates electric energy to charge the cart 100. The cart 100 is charged based on power provided by the power connector 290. At this time, the charger 210 charges based on a charge allocation, and the charge allocation is set for each cart under the control of the controller 250.

Charge allocation refers to a magnitude of power allocated to charge each of the carts. For example, a charging speed or charging time of the battery depends on a magnitude of charging current. Therefore, in one embodiment, the charge allocation is determined based on the magnitude of the charging current of the battery. However, the charge allocation may be set based on electrical properties other than the current amount through the charging method, but the present disclosure is not limited thereto. That is, according to the present disclosure, the charge allocation may indicate various types of electrical properties such as the magnitude of the current and the magnitude of the voltage based on types of batteries or through a method of charging the battery.

The power supply device 300 may set the magnitude of electrical energy allocated for charging for each cart based on charge demand information received from each of carts and properties of each of carts. The information on charge allocation is numerical information allocated by the cart from the power supply device to charge performed by the charger 210.

In one embodiment, the information on charge allocation is information on the amount of current applied when each cart is charged. Information on charge allocation allocated to charging, received by each cart may be different for each cart. The difference in the change allocation between carts occurs based on to the positions of the carts, charging capacity of the charger 210, and the like.

The charged state of electrical energy by the charger 210 may be determined by the controller 250, and the information on the charged electric energy in the charger 210 may be transmitted to an external power supply device 300 or another cart through the communicator 280.

The obstacle sensor 220 senses an obstacle disposed around the cart.

The mover 190 provides the power based on the electric energy charged by the charger to move the cart 100. The controller 250 may determine a moving distance or a moving direction of the cart 100 based on a rotation speed, a number of rotations, and a direction of wheels of the mover 190 to determine the movement of the mover 190.

The communicator 280 may remotely upgrade software of the control portion 150. Alternatively, the communicator 280 may provide, to outside, a state in which electric energy is charged by the charger or identification information related to a cart, or may receive information on other carts. The communicator 280 transmits, to the power supply device 300 (see FIG. 3), identification information related to the cart and the information on charge demand and receives the information on charge allocation from the power supply device 300 (see FIG. 3). The transmitted and received information includes, for example, numerical information related to a charge demand, numerical information related to a charge allocation allocated to the charge, and the like. Alternatively, the information on charge allocation may be determined based on the magnitude of the current amount allocated for charging.

The interface 230 outputs information so that a user may check an amount of charging performed by the charger 210. In some examples, predetermined advertisements may be output, and the communicator 280 may receive information to be output to the interface 230 such as advertisements or messages. In some examples, the communicator 280 may transmit, to an external server, the information on the product accommodated in the accommodator 110 to facilitate payment in unmanned stores.

The controller 250 controls other components. The controller 250 includes a battery management system (BMS). In some examples, the controller 250 may further include a charging circuit. The controller 250 may control the power connector 290 to manage charging and transmit a portion of the input power to another cart.

In particular, the controller 250 controls the charging of the charger 210 based on the information on charge allocation for each cart set by the power supply device 300 (see FIG. 3), for example, information on the charging current amount. Controlling the charging based on the charge allocation (e.g., the charging current amount) may be controlled by the BMS of the controller 250.

The power connector 290 is electrically connected to the power supply device. Alternatively, the power connector 290 is electrically connected to other carts. The above configurations are described in detail with reference to FIGS. 5 and 6, 11 and 12.

Figure 3:
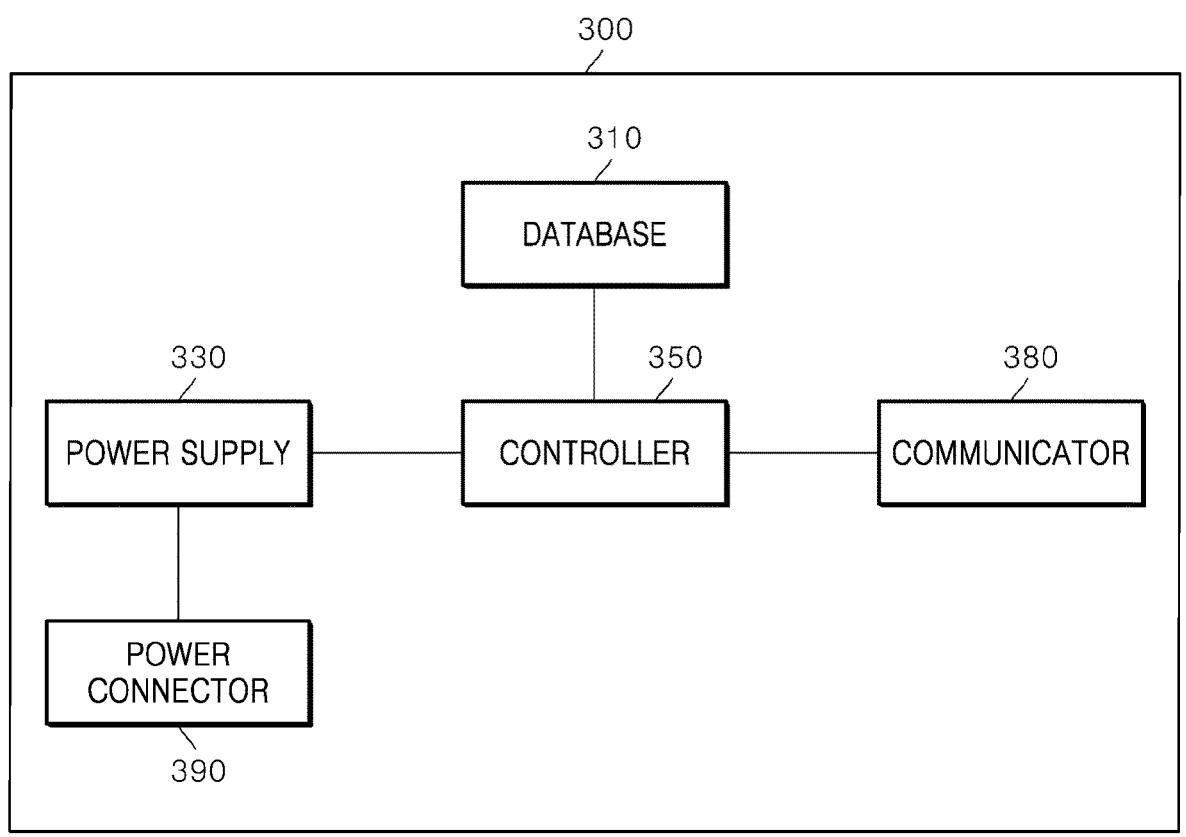
FIG. 3 shows an exemplary embodiment of configuration of a power supply device 300.

FIG. 3 shows exemplary embodiment of configuration of a power supply device 300. The power supply 300 includes a power supplier 330 that supplies electrical energy to one or more electrically connected carts and a communicator 380 that receives information from an external server or a cart or transmits information to an external server or a cart.

In some examples, the power supply device 300 optionally includes a database 310, and stores identification information related to the cart and information on properties to charge the cart. The controller 350 controls the above-mentioned components.

The power connector 390 is disposed outside the power supply device 300 and is electrically connected to the power connector 290 of the cart 100. Alternatively, the power connector 390 may include a kind of plug and wire. Alternatively, the power connector 390 may have a form of a connection terminal.

The controller 350 may vary a weight number for each cart based on a state in which the multiple carts are charged or the charge demand information transmitted by each cart to charge the cart.

When the above-described configurations are applied, the cart may be charged in the cascade mechanism in which multiple carts are electrically connected to one another and any one cart is connected to the power supply device 100, total carts may be charged.

A plurality of power connectors 390 in FIG. 3 may be provided. In this case, N numbers of power connectors 390 may supply power to the carts disposed in N numbers of rows.

For example, the first power connector supplies power to five carts in a first row. A second power connector supplies power to three carts in a second row. A third power connector supplies power to four carts in a third row.

Nth number of power connector supplies power to m numbers of carts included in a Nth row. In this configuration, the controller 350 may calculate, for each row, the charge allocation of carts in each of carts connected to each of power connectors.

Alternatively, the controller 350 may calculate and allocate charge allocation of carts disposed in all rows connected to all power connections. The controller 350 calculates a charge allocation for each cart and each row by reflecting the magnitude of the electric energy that may be provided by the power supply device and the charging state of the carts.

Figure 4:
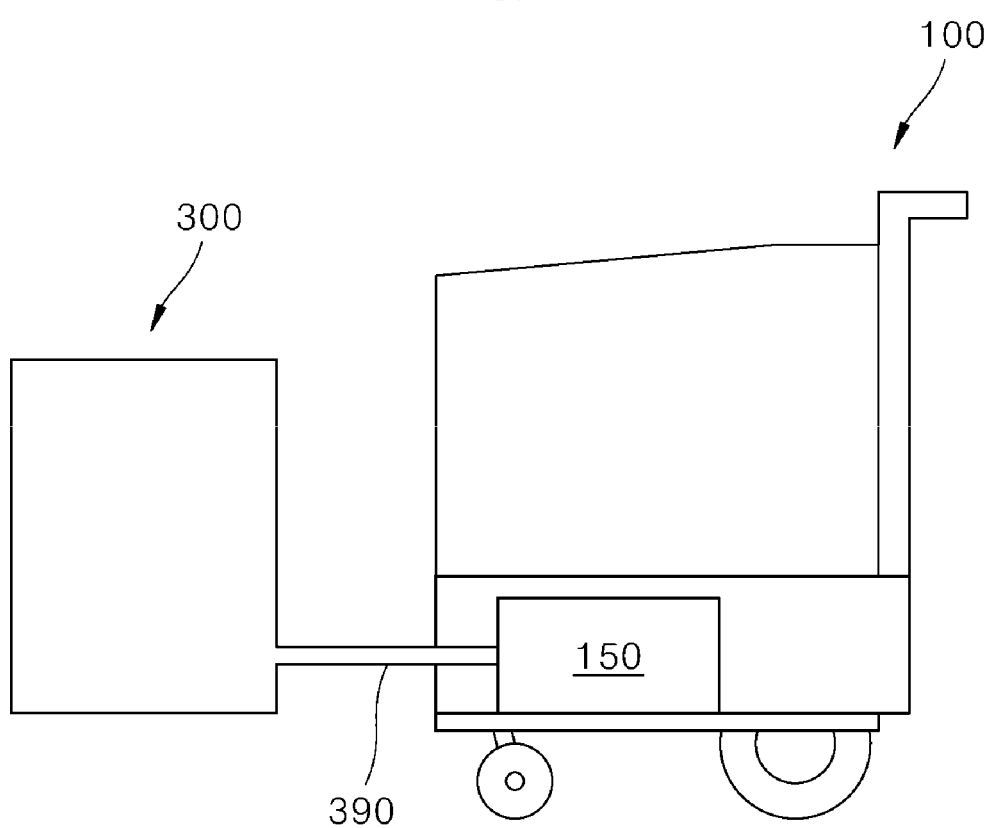
FIG. 4 shows an exemplary embodiment of cart connected to a power supply device.

FIG. 4 shows an exemplary embodiment of configuration in which one cart is connected to a power supply device. When one cart 100 is connected to a power supply device 300, a control portion 150 of the cart 100 controls charging of the cart 100. A controller 250 of the control portion 150 of the cart 100 may include a charging circuit and a BMS, and the controller 250 controls the charger 210 to charge electrical energy of the power supply device 300.

Figure 5:
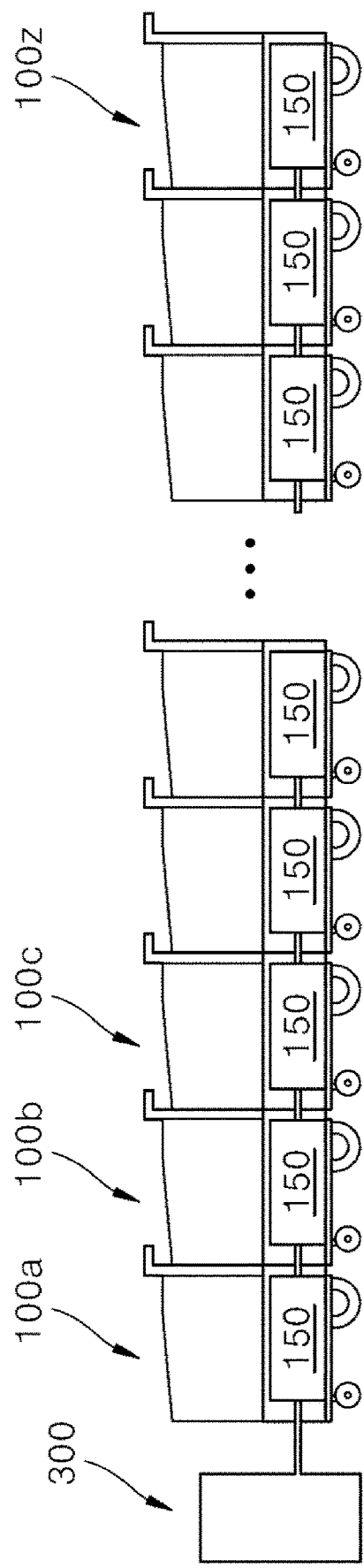
FIGS. 5 and 6 show exemplary embodiments of two or more carts connected to a power supply device.
Figure 6:
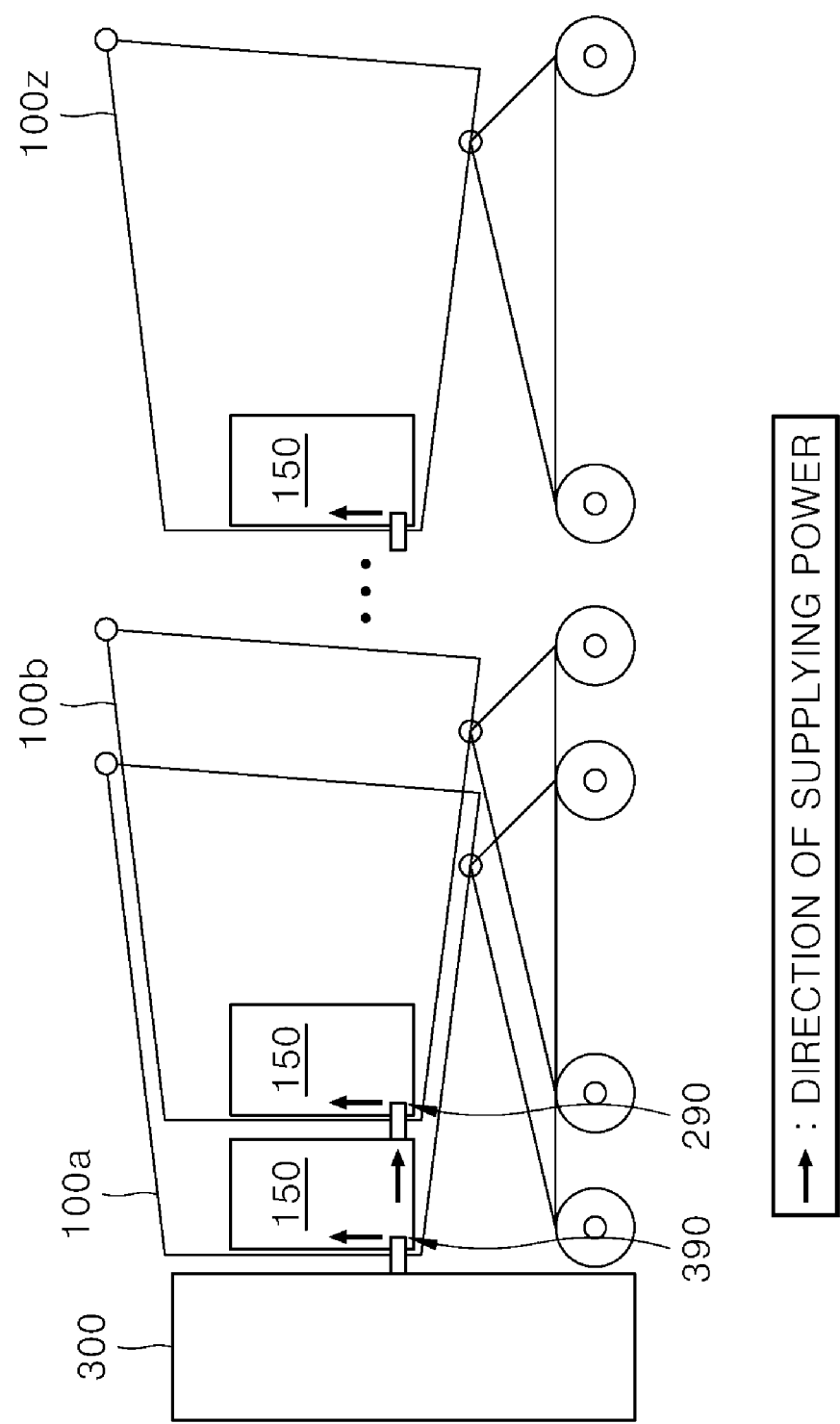

FIGS. 5 and 6 show exemplary embodiments two or more carts connected to a power supply device. Carts 100a, 100b, . . . , 100z are sequentially disposed for the multiple carts to electrically connect one power supply device.

In one embodiment, a power receiving connector may be disposed on a front surface of appearance of the cart and may be connected to the power supply device 300 or electrically connected to other carts to receive the power. Alternatively, a power transmitting connector may be disposed on a rear surface of appearance of the cart and may be electrically connected to other carts to supply the power to other carts.

Alternatively, a power receiving connector and a power transmitting connector may be disposed at both sides of the control portion 150 of the cart in a nesting structure (shown in FIG. 6) in which carts are overlapped with one another. When the carts are combined in a nesting form so that the carts are overlapped with each other, the control portions 150 of the carts may be adjacent to one another to electrically connect the carts to thereby share power among carts. In the case of FIG. 6, when the carts are connected with one another with the nesting structure, the accommodator may be moved in a direction in which the control portion 150 is not disposed.

As shown in FIG. 5 or 6, when multiple carts 100a, 100b, . . . , 100z are electrically connected to one another and the power supply device charges multiple carts, a charging time of the carts may increase or decrease based on the amount of current supplied by the power supply device. As the amount of current that may be supplied by the power supply device is limited, a number of carts that may be charged by the power supply device 300 at the same time may be limited. In some examples, only some carts are powered for charging based on priority set for the carts by the power supply device. Low-priority carts are not charged and the received power is transmitted to other carts.

Multiple carts include a communicator 280 that may be or include a module that performs communication, and the communicator 280 receives information on charging power required for each cart from the power supply device 300, and accordingly the controller 250 of the control portion 150 may control the charging of the charger 210.

The communicator 280 may transmit and receive information to and from the power supply device 300 using a Bluetooth communication protocol or a power line communication protocol. Alternatively, the communicator 280 may transmit and receive information to and from the power supply device 300 using a Zigbee communication protocol.

As multiple carts are electrically connected, the power supply device may set priorities of carts based on a maximum current value that may be supplied, a number of carts, or a number of carts that require emergency charging.

Figure 7:
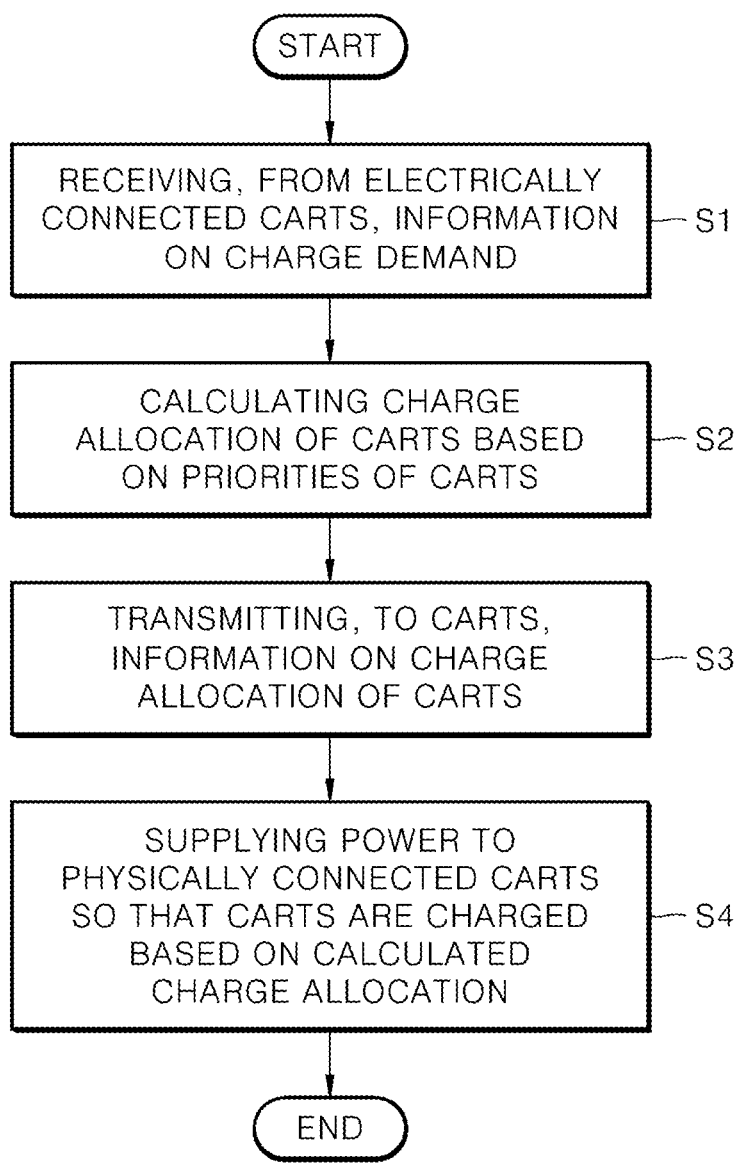
FIG. 7 shows an exemplary embodiment of process of setting, by a power supply device, priorities of carts.

FIG. 7 shows an exemplary embodiment of process of setting priorities of carts by a power supply device.

A communicator 380 of a power supply device 300 receives information on charge demand from one or more electrically connected carts (S1). The information on charging demand includes information on remaining battery capacity or charging capacity of the battery of the cart. "Electrically connected" refers that one cart 100a is physically connected to the power supply device 300 as shown in FIG. 5 or 6, and subsequently the cart 100b is physically connected to the first cart 100a so that carts 100c, 100d, . . . , 100z are sequentially connected through the connection.

A controller 350 calculates charge allocations for the carts based on priorities of carts (S2). The priorities of the carts may be determined in various ways. High-priority carts are charged in a less time period. To this end, more charge quotas are allocated to high-priority carts. As a result, high-priority carts charge the charger based on a greater amount of charge current.

According to an embodiment, the controller 350 may determine the priority of each cart based on information on charge demand transmitted by each cart and may calculate a charge allocation based on the determined priority of each of carts. Carts with high charge demands require rapid charging because the carts with high charge demands are low-charged state. Therefore, the controller 350 sets the charge allocation so that a large amount of current is allocated based on increasing the priority of carts.

Alternatively, the controller 350 may determine the priority of the cart to calculate the charge allocation based on a sequence in which carts are connected, that is, information on a connection sequence of each of carts. The connection sequence information is set by increasing the connection sequence related to the cart based on the sequence in which carts are connected to the power supply device.

For example, in FIG. 5 or 6, the connection sequence information related to the first cart 100a may be set to be 1, and the connection sequence information related to the second cart 100b may be set to be 2. The connection sequence of the cart 100z at a last end may be 26.

The cart may be first used by the user as the cart has the higher connection sequence. The user may use carts disposed at the last end based on sequences of carts. Therefore, as the cart may be used in a short time as the cart has the higher connection sequence, the cart having the high connection sequence is required to be charged. Therefore, the controller 350 sets high charge allocation for the cart having the higher connection sequence.

As the carts have the higher connection sequence, the controller 350 may set for the carts to have the high priorities to charge based on the above configuration. Thus, the controller 350 may increase the charge allocation to be supplied to the cart having the high connection sequence determined based on the charge allocation. The cart having the high connection sequence performs the charging based on the increased amount of charging current.

Alternatively, the controller 350 may set priorities of carts based on the charging time of each cart stored in the database 310. That is, the charge allocation may be set differently based on charging properties of carts.

After the controller 350 determines priorities of carts and calculates the charge allocation of the carts in various manners, the communicator transmits, to the respective carts, the information on charge allocation of carts (S3). Subsequently, the power supplier 330 supplies power to the cart 100a that is physically connected to charge the carts based on the calculated charge allocation (S4).

The first cart 100a supplies a first portion of the power to charge the charger of the first cart 100a by the charge allocation of the first cart 100a and transmits a second portion of the power to a subsequent cart 100b. As usage probability of the first cart 100a is low, so the first cart 100a may only perform a function for supplying the power so that other carts are charged first.

As carts 100a, 100b, . . . , 100z receive the information on the charge allocation, the controller 250 of the carts may charge the charger 210 based on a first portion of power, i.e., the allocated current amount, of the power applied by the power connector 290 and may transmit a second portion of the power to other carts.

Figure 8:
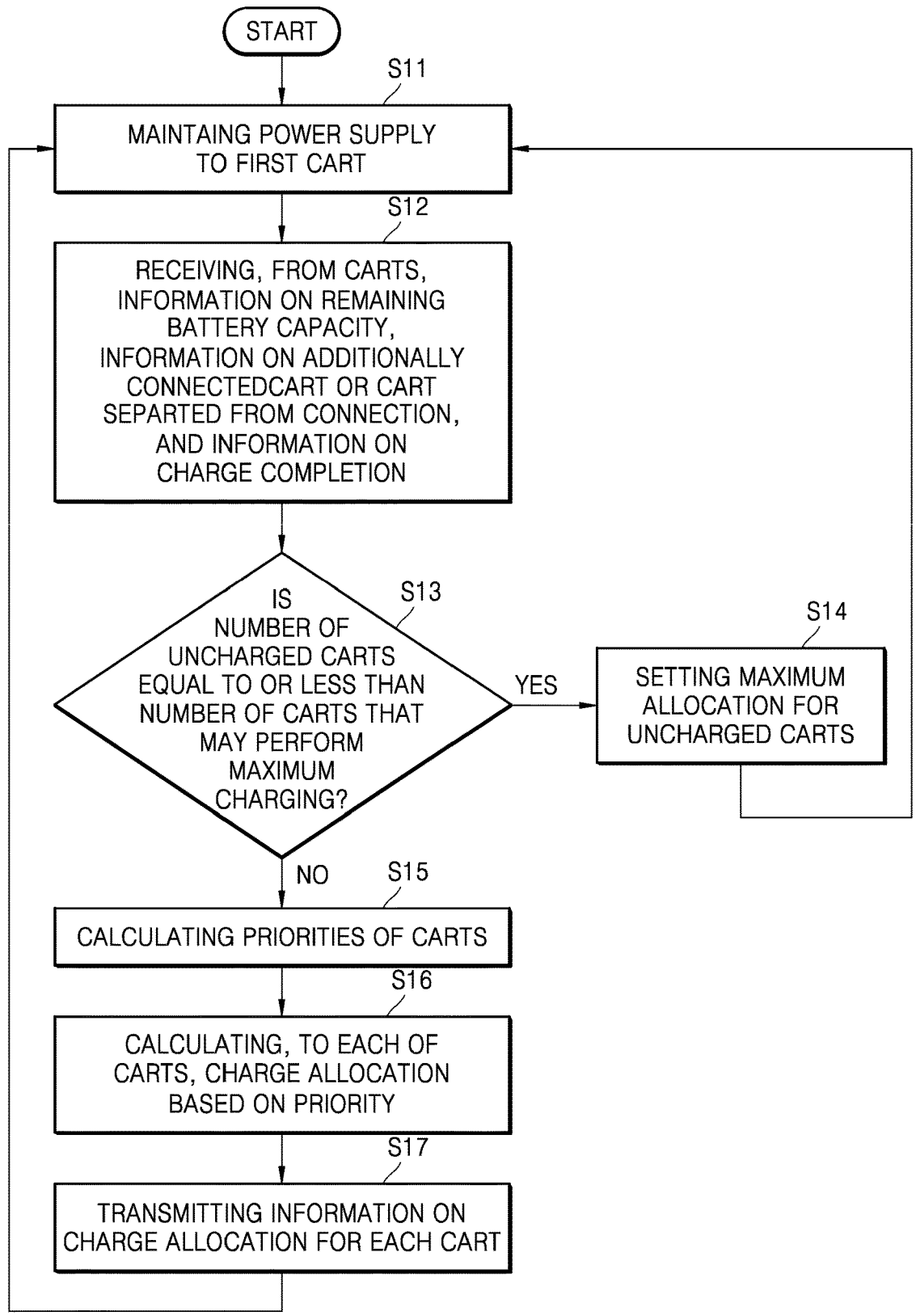
FIG. 8 shows an exemplary process of changing priorities based on increase and decrease in a number of carts.

FIG. 8 shows an exemplary process of changing priorities of carts based on increase and decrease of a number of carts.

One or more carts are connected to a power supply device 300, and the power supply device 300 maintains power supply to a first cart (S11). In some examples, each cart has received information on charge allocation. The first cart uses a first portion of the power to charge by the current allocation for charging and provides a second portion of the power to another cart connected to the first cart. If charging the first cart is completed, the first cart electrically connects another cart connected to the first cart to the power supply device 300, such as a kind of plug.

With regular time intervals, or in real time, the power supply device 300 receives the information from the carts (S12). The information received by the power supply device 300 may be information on remaining battery capacity of each cart and information on new cart additionally connected, or a cart, which was connected, separated from the connection. Alternatively, charging completion information indicating that charging the connected cart is completed is also received at the power supply device 300 from the carts.

Based on collecting the received information, the controller 350 of the power supply device 300 determines a number of uncharged carts (UNCHARGED_CART_NUM) among currently connected carts. In some examples, the controller 350 of the power supply device 300 determines whether a number of uncharged carts is equal to or less than a number of carts that may be charged with a maximum level (FULL_CHARGING_CART_NUM) (S13).

A number of carts capable of full charge (FULL_CHARGING_CART_NUM) may vary based on electric capacity of the power supply device 300 and the battery capacity of the cart. For example, when the power supply 300 supplies power having an output of 1500 W and 60V/30 A, a cart that uses an 800 Wh-class battery may simultaneously charge 15 carts for 6 hours of charging.

Therefore, a number of carts capable of maximum charging (FULL_CHARGING_CART_NUM) is determined based on the charging time or the charging capacity of the cart. In some examples, if the uncharged cart having a less number of FULL_CHARGING_CART_NUM is connected to the power supply device 300, a maximum current amount is set for all uncharged carts without additionally determining the priorities of carts to charge carts.

For example, in some cases, where a number of carts capable of full charging (FULL_CHARGING_CART_NUM) is 5, and 5 or less uncharged carts are connected, the controller 350 may rapidly charge the cart with a maximum current amount (maximum charge allocation) without setting the priorities of carts. To this end, the controller 350 sets, to the uncharged carts, the maximum allocation, that is, the maximum current amount (S14).

As a result, the communicator 390 of the power supply device 300 transmits, to the uncharged carts, a message indicating that uncharged carts are required to be rapidly charged, and the uncharged carts that have received the message are rapidly charged based on the maximum current amount. The maximum current amount may be set in various ways.

In some example, in the case of FULL_CHARGING_CART_NUM<UNCHARGED_CART_NUM in S13, the controller 350 of the power supply device 300 generates the priority of each cart (S15). Subsequently, the controller 350 of the power supply device 300 calculates the charge allocation for each cart based on the priorities of carts (S16).

In some cases, where one or more carts are additionally connected to the power supply device or one or more carts stop connecting to the power supply device, the controller 350 may generate the connection sequence information again and determine priorities of the carts that maintain connection to the power supply device again to calculate the charge allocation again.

In some examples, the process also reflects information on a current state of battery capacity of each cart. The controller 350 of the power supply device 300 sets the charge allocation of the cart that has completed the charging to be 0 to end the charging, and the cart that has completed the charging provides a function of transmitting the power to a subsequent cart.

The communicator 390 of the power supply device 300 transmits, to carts, information on the calculated charge allocation (S17), and accordingly, the controller 250 of each cart charges the charger 210 based on the allocated charging current.

The controller 350 of the power supply device 300 may calculate the charge allocation of each cart using a charging algorithm shown in FIG. 8. The controller 350 of the power supply device 300 newly sets the charge allocation of the cart when cart is connected or separated. The controller 350 of the power supply device 300 sets the maximum charging current for a number of carts that may be charged based on the supply current of the power supplier (FULL_CHARGING_CART_NUM).

In some examples, the controller 350 of the power supply device 300 variably sets the charging current when a number of connected carts (UNCHARGED_CART_NUM) is greater than an allowable maximum charging current.

In this process, the controller 350 of the power supply device 300 may set a reference battery capacity and may charge, with a high priority, carts having a battery having a less capacity than a reference battery capacity. In some examples, the controller 350 of the power supply device 300 may charge the cart at the rear (having higher connection sequence) with a highest priority when many carts have a battery having a less capacity than the reference battery capacity. That is, the controller 350 of the power supply device 300 preferentially charges the cart disposed at the rear.

Figure 9:
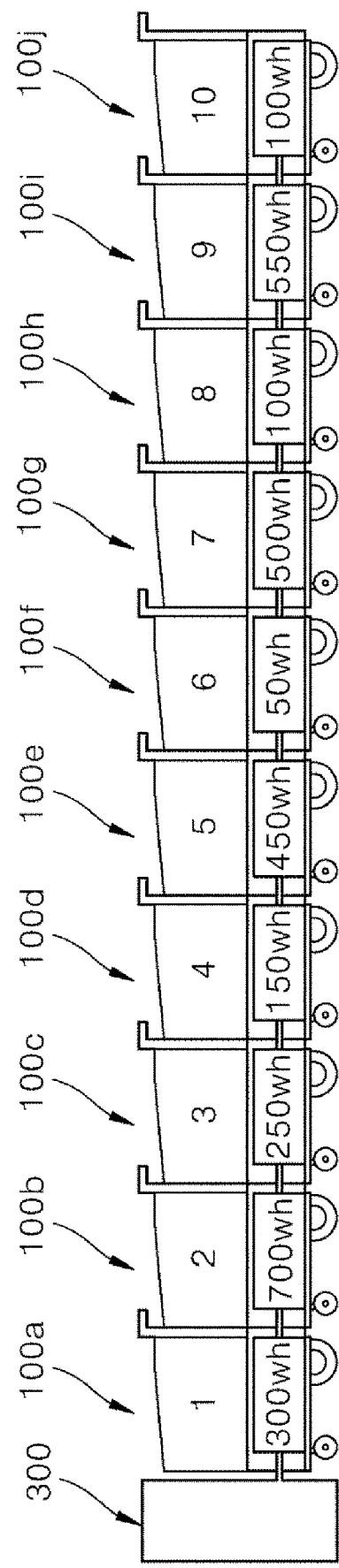
FIG. 9 shows an exemplary embodiment of charging of a cart.

FIG. 9 shows an exemplary embodiment of charging a cart.

Carts 100a to 100j are sequentially connected to a power supply 300. Numbers 1, 2, . . . , 10 described for carts correspond to connection sequence information related to carts. Remaining battery capacities is displayed in carts.

A controller 350 of the power supply device 300 sets a reference battery capacity to be 200 Wh. Therefore, the carts 100d, 100f, 100h, and 100j having less battery capacities than 200 Wh are first charged. The connection sequences of the carts 100d, 100f, 100h, and 100j are 4, 6, 8 and 10, respectively.

A weight number may be provided to each of carts based on the connection sequence information related to carts. For example, as the connection sequence information related to the first cart 100a is 1, a weight number is set to be 1.0 for the first cart 100a. As the connection sequence information related to the second cart 100b is 2, a weight number is set to be 1.1 for the second cart 100b. Based on increasing the weight number by 0.1 in response to an increase in the connection sequence, a weight number of 1.8 is set for a ninth cart 100i and a weight number of 1.9 is set for a tenth cart 100j. In the example of FIG. 9, the power supply device 300 calculates the charge allocation based on the magnitude of the current amount.

When the power supply device 300 outputs supply current of 30 A, the amount of current to preferentially charge the four carts 100d, 100f, 100h, and 100j is calculated as follows. The weight numbers of 1.3, 1.5, 1.7, and 1.9 of the four carts 100d, 100f, 100h, and 100j are used as shown in Equation 1.

$$\text{Supply current} = \text{current} \times (\text{sum of weight numbers of carts to charge})$$

$$30\ A = \text{unit current} \times (1.3+1.5+1.7+1.9) \qquad \text{Equation 1:}$$

Unit current: 4.6875 A

When the calculated current is multiplied by weight numbers of 1.3, 1.5, 1.7, and 1.9 of the four carts 100d, 100f, 100h, and 100j, the amount of charging current set for the four carts is as follows.

Charging current amount set for the fourth cart (100d): 6.09375 A (=4.6875×1.3)

Charging current set for the sixth cart (100f): 7.03125 A (=4.6875×1.5)

Charging current set for the eighth cart (100h): 7.96875 A (=4.6875×1.7)

Charging current set for the tenth cart (100j): 8.90625 A (=4.6875×1.9)

When the power supply device 300 transmits, to carts, the charging current amount set as described above, carts perform charging based on the set charging current amount. Carts that receive information on a charging current amount of "0" perform a function of transmitting power to subsequent carts without charging.

In the example of FIG. 9, the power supply device 300 may calculate an actual amount of charging current (the charge allocation) by reflecting the remaining battery capacities of the carts, positions of the carts, and the like.

In the example of FIG. 9, when a new cart is connected to the last cart 100j and new cart has a very low level of battery capacity remaining in the battery of the new cart (e.g., 10% or less of a reference battery capacity), the new cart may transmit, to the power supply device 300, a message requesting a rapid charge.

When a communicator 380 of the power supply device 300 receives the message to request the rapid charge, the controller 350 of the power supply device 300 changes priority of the cart that has transmitted the message requesting the rapid charge so that a maximum amount of charging current is allocated to the cart that has transmitted the message requesting the rapid charging. For example, in the above-mentioned embodiment, a weight number of 3.2 is set for the newly connected cart and Equation 2 is applied and the output of the calculation 10 A is allocated to the newly connected cart.

$$30\ A = \text{unit current} \times (1.3+1.5+1.7+1.9+3.2) \qquad \text{Equation 2:}$$

Newly calculated unit current: 3.125 A

The controller 350 multiplies the calculated unit current by 1.3, 1.5, 1.7, and 1.9, and 3.2 which are weight numbers of the five carts 100d, 100f, 100h, 100j, and new cart. As a result, the charging current amount reset for the five carts is as follows.

Charging current amount set for the fourth cart (100d): 4.0625 A (=3.125×1.3)

Charging current amount set for the sixth cart (100f): 4.6875 A (=3.125×1.5)

Charging current amount set for the eighth cart (100h): 5.3125 A (=3.125×1.7)

Charging current amount set for the tenth cart (100j): 5.9375 A (=3.125×1.9)

Charging current amount set for new cart: 10 A (=3.125× 3.2)

Figure 10:
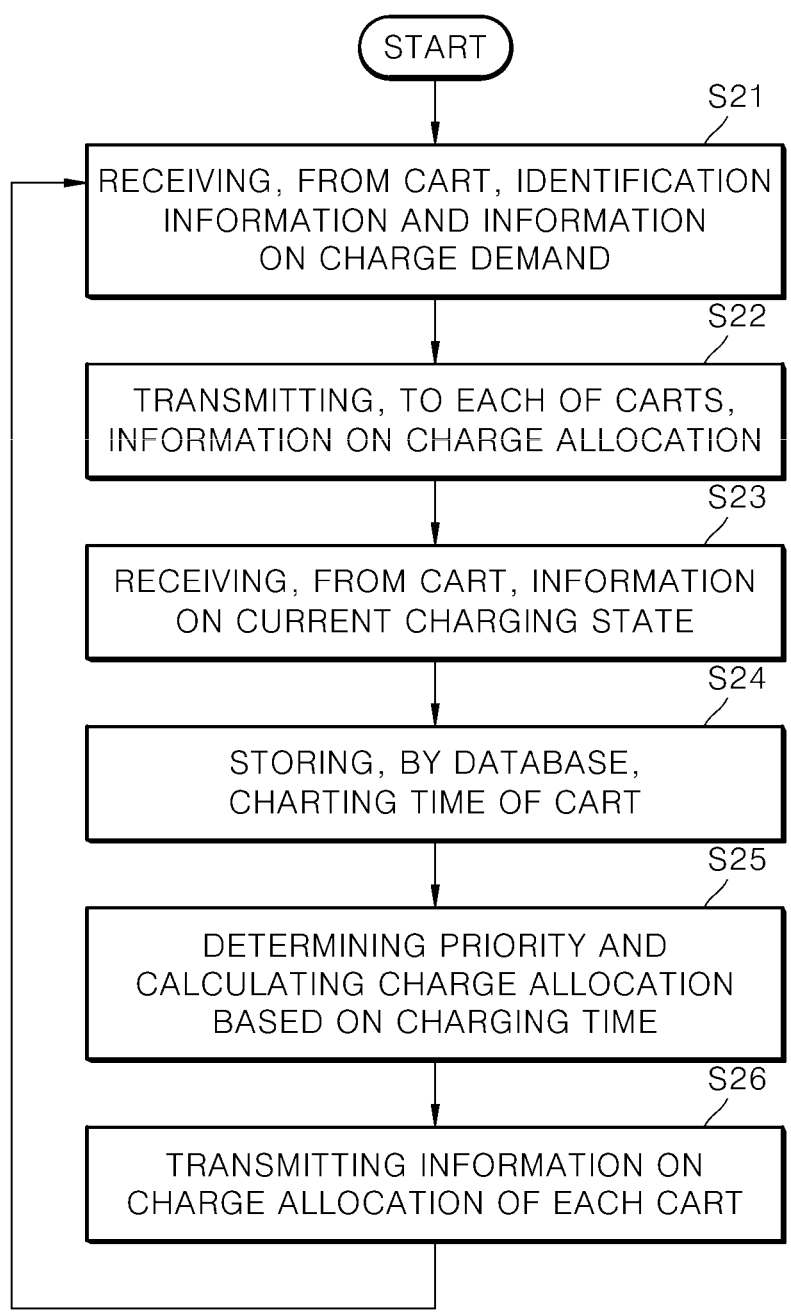
FIG. 10 shows an exemplary process of determining priorities based on charging speed of carts.

FIG. 10 shows an exemplary process of determining priorities of carts based on charging speed of carts. A time taken to charge carts may vary based on batteries, for example, a number of charging and discharging of batteries disposed in carts even if the carts have the same charge demand.

A communicator 380 of a power supply device 300 receives, from the cart, identification information and information on charge demand (S21). Based on the priority set according to the above-described embodiments, the controller 350 of the power supply device 300 calculates a charge allocation for each cart, and the communicator 380 transmits information on charge allocation of each of carts (S22).

Subsequently, charging information related to a current state is received from the cart at regular time intervals or in real time (S23). The controller 350 of the power supply device 300 calculates a charging time of the cart based on a time point when information on the charge allocation is transmitted, a time point when the charging information related to the current state is received, and a unit time taken to charge the battery of the cart based on the charge allocation. Database 310 stores identification information related to the cart and charging time of the cart (S24).

In some examples, the controller 350 determines priorities based on the charging time of carts, and calculates the charge allocation based on the determined priorities (S25). Subsequently, the communicator 380 transmits, to each cart, the information on charge allocation for each cart (S26).

In an additional embodiment, the controller 350 calculates an expected charging time of each cart based on the charging time stored in the database 310 and the charge allocation to be allocated for each cart. The communicator 380 transmits, to each of carts, information on the determined expected charging time. The interface 230 of the cart 100 outputs the expected charging time and the user may check the expected charging time of the cart.

Figure 11:
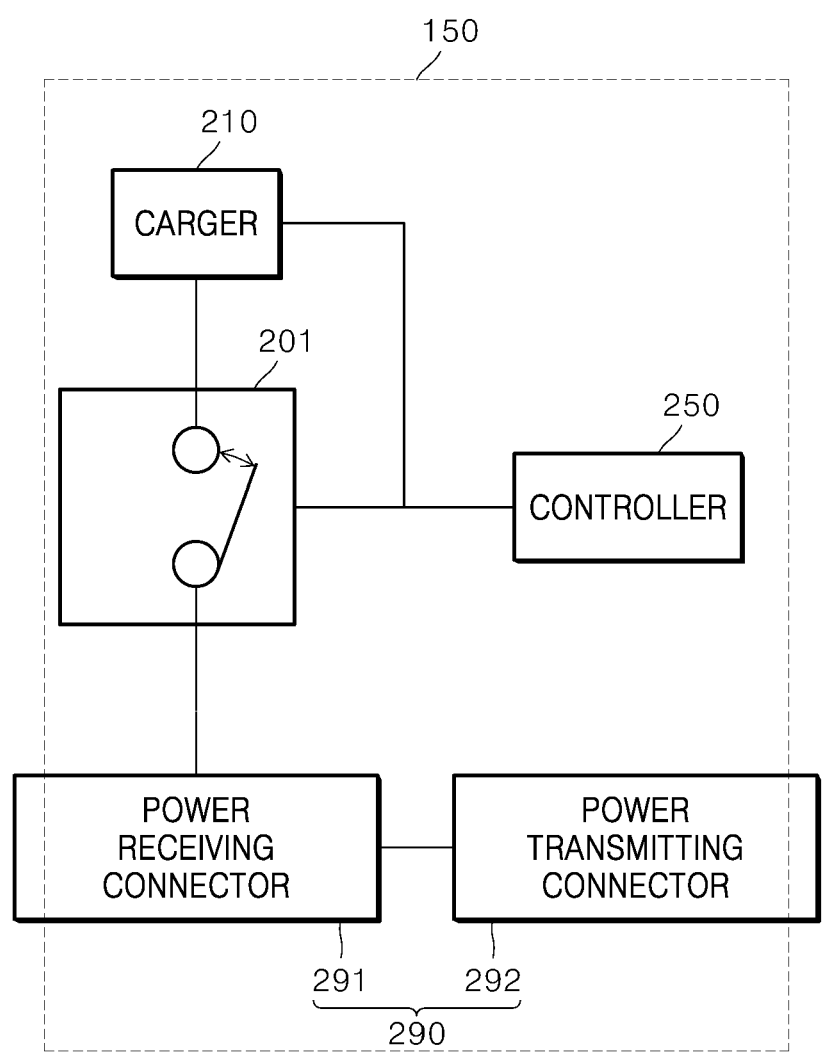
FIG. 11 shows an exemplary configuration of a charger and a power connector of a cart in detail.

FIG. 11 shows an exemplary configuration of a charger and a power connector of a cart in detail. Components of a control portion not directly involved in charging are not shown. A power connector 290 includes a power receiving connector 291 and a power transmitting connector 292.

The power receiving connection 291 receives power from a power supply device or another cart. The power transmitting connector 292 transmits, to another cart, the power supplied by the power receiving connector 291.

A switch 201 is disposed between the charger 210 and the power receiving connector 291 and is turned on/off under the control of the controller 250. When charging the charger 210 is completed, the controller 250 turns off the switch. The communicator 280 (see FIG. 2) transmits a charging completion message to the power supply device 300 (see FIG. 3).

In summary, when the communicator 250 receives the information on charge allocation of the cart from the power supply device 300, the controller 250 may control the charger 210 to charge the charger 210 based on the current amount allocated among an amount of current of the received power at the power receiving connector 291. After the charging the cart is completed, the controller 250 controls the switch 201 to electrically disconnect the power receiving connector 291 from the charger 210.

Figure 12:
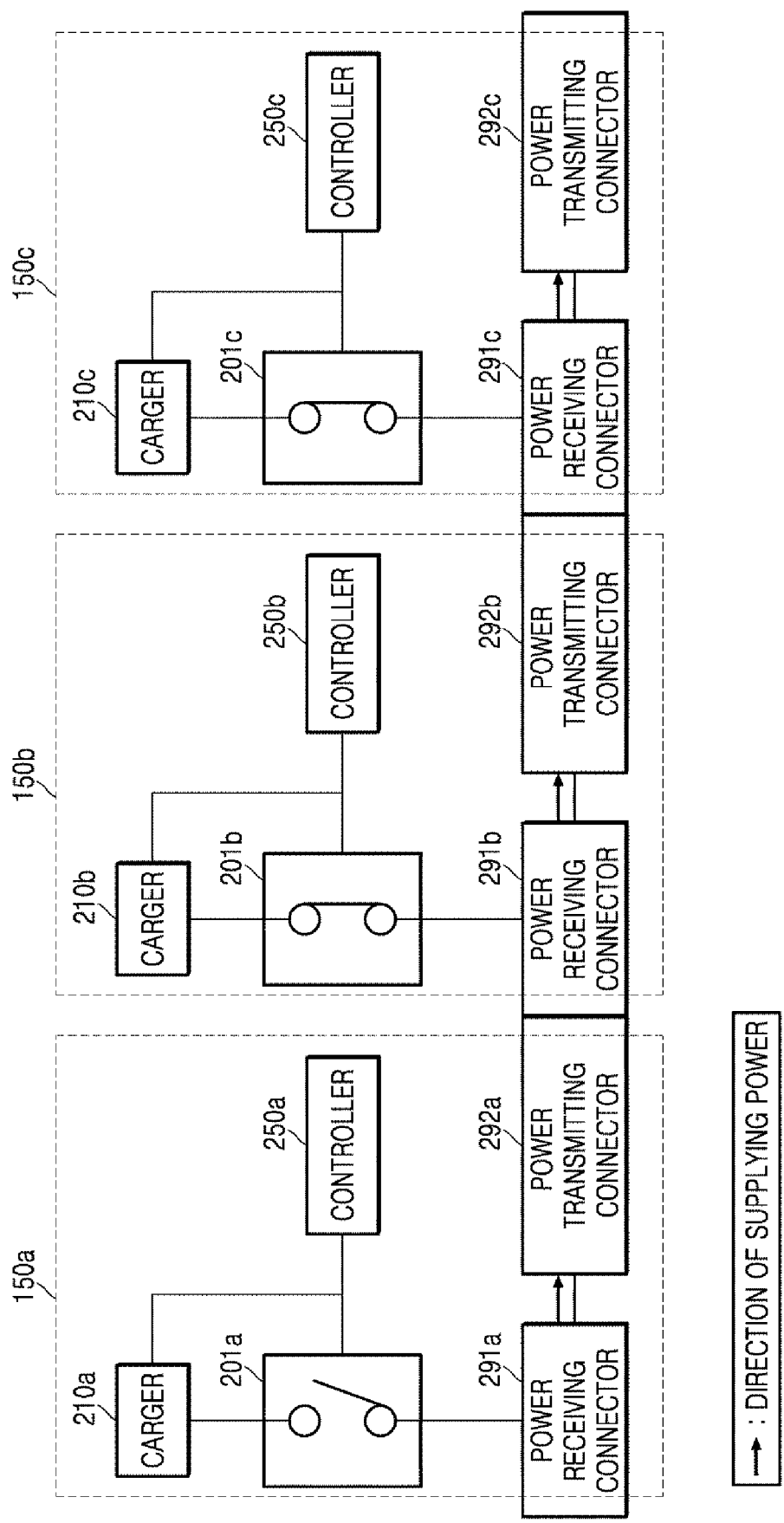
FIG. 12 shows exemplary embodiment of power connectors of control portions connected to one another.

FIG. 12 shows exemplary embodiment of power connectors of control portions connected to one another. Three control portions 150a, 150b, and 150c disposed on three carts, respectively, are electrically connected to one another. Components of the control portion not directly involved in charging are not shown.

A power receiving connector 291a of the first control portion 150a is electrically connected to another cart or a power supply device to receive power. A power transmitting connector 292a of the first control portion 150a is connected to a power receiving connector 291b of the second control portion 150b. The power received at the power receiving connector 291a of the first control portion 150a is supplied to the second control portion 150b through electric connection between the power transmitting connector 292a of the first control portion 150a and the power receiving connector 291b of the second control portion 150b.

Similarly, the power transmitting connector 292b of the second control portion 150b is connected to the power receiving connector 291c of the third control portion 150c. The power received at the power receiving connector 291b of the second control portion 150b is supplied to a third control portion 150c through the electrical power between the power transmitting connector 292b of the second control portion 150b and the power receiving connector 291c of the third control portion 150c.

Another cart may be electrically connected to the power transmitting connector 292c of the third control portion 150c. Alternatively, another cart may not be connected to the power transmitting connector 292c of the third control portion 150c of a last cart.

In FIG. 12, the switch 201a of the first control portion 150a is open. In this case, the controller 250a controls the switch 201a, so that the cart is not charged because charging the charger 210 of the first control portion 150a is completed. In another embodiment, as the first control portion 150a has very low priority, the charger 210a of the first control portion 150a is not charged and the power is supplied to control portions 150b and 150c of subsequent carts.

The communicator of the third control portion 150c may transmit, based on the cart in which the third control portion 150c is disposed is the last cart, that is, no other cart is connected to the power transmitting connector 292c of the third control portion 150c, a message for requesting rapid charging to the power supply device 300. As the cart in which the third control portion 150c is disposed is the last cart and may be separated by the user to be used, the communicator of the third control portion 150c may request, based on the remaining battery capacity being equal to or less than a predetermined battery capacity level, the rapid charging to the power supply device 300.

In the configuration of FIG. 12, when the cart in which the third control portion 150c is disposed is separated from the cart in which the second control portion 150b is disposed and moves, the cart in which the second control portion 150b is disposed becomes a last cart. Similarly, the communicator of the second control portion 150b may transmit, to the power supply device 300, a message for requesting rapid charging.

When embodiments of the present disclosure are applied, it is possible to charge the battery of multiple carts at the same time. In this process, a current value used for the charging may be set based on the priority thereof in consideration of availability of the cart or the remaining battery level. In some examples, the cart disposed at a rearmost may be charged at a highest priority so that the user immediately uses the cart disposed at the rearmost.

In some examples, an interface 230 of the cart may indicate a charging state of the cart. For example, the interface 230 may indicate an available time for the cart based on a currently charged state of the charger 210. The user may determine whether the cart is used based on available time information displayed on the interface 230 and according to intention of the user.

For example, two or more power supply devices are disposed in one space, and two carts are disposed at a rearmost. As a first cart of the two carts disposed at the rearmost is being charged after being completely discharged, the interface 230 displays the available time as 5 minutes. As the second cart of the two carts disposed at the rearmost has completed charging, the interface 230 displays the available time as 3 hours, the user may select the second cart of the two carts disposed at the rearmost among the two carts disposed at the rearmost.

In some examples, the interface 230 may indicate that the cart is available or is being charged based on colors. Alternatively, the interface 230 may indicate that the cart is available or is being charged according to a voice message.

In one embodiment, the cart, which is disposed at an end of each of the plurality of charging rows and is ready for being charged and is expected to be used, may display, on the interface 230, the charging state of the cart or the charging state of the charging row.

Figure 13:
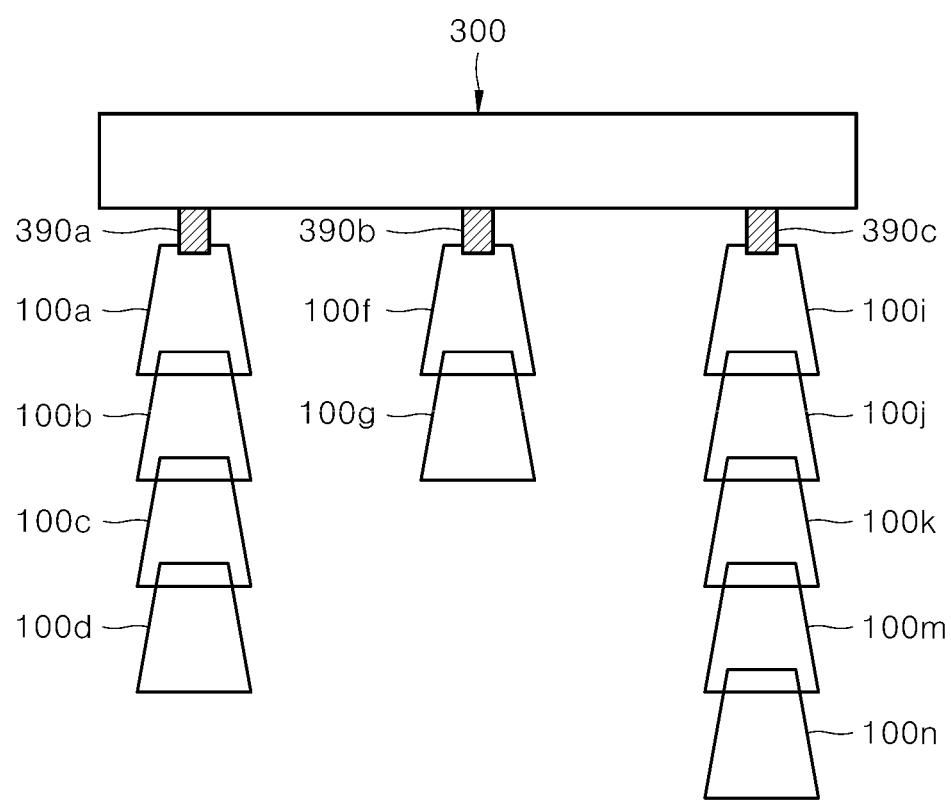
FIGS. 13 to 15 show an exemplary embodiment of information displayed by last carts in a plurality of charging rows.
Figure 14:
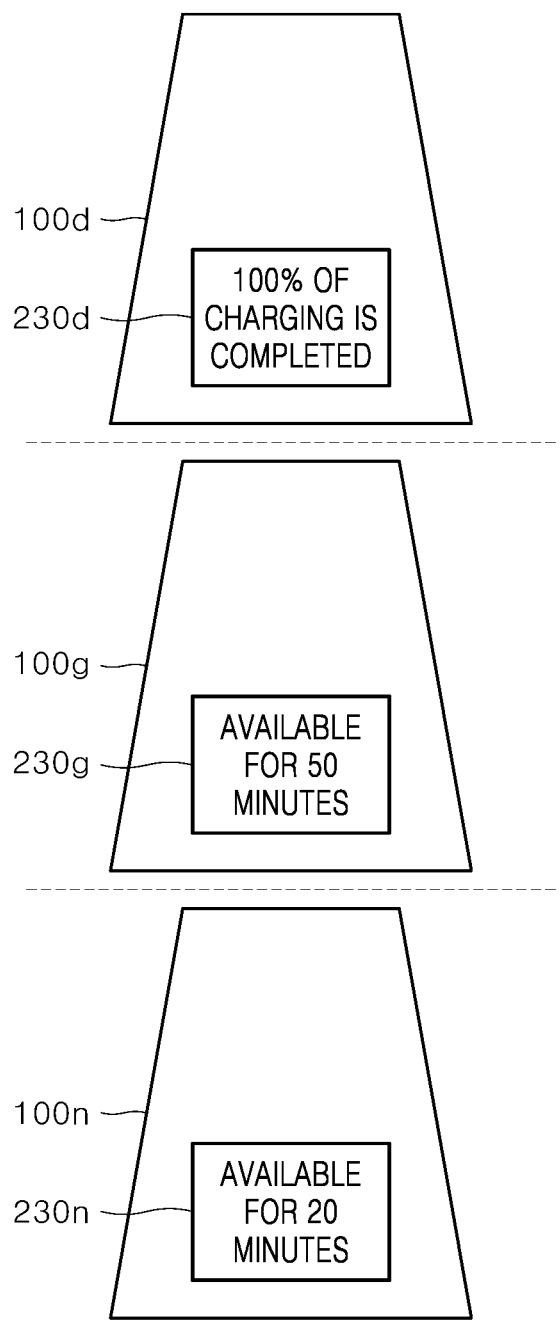
Figure 15:
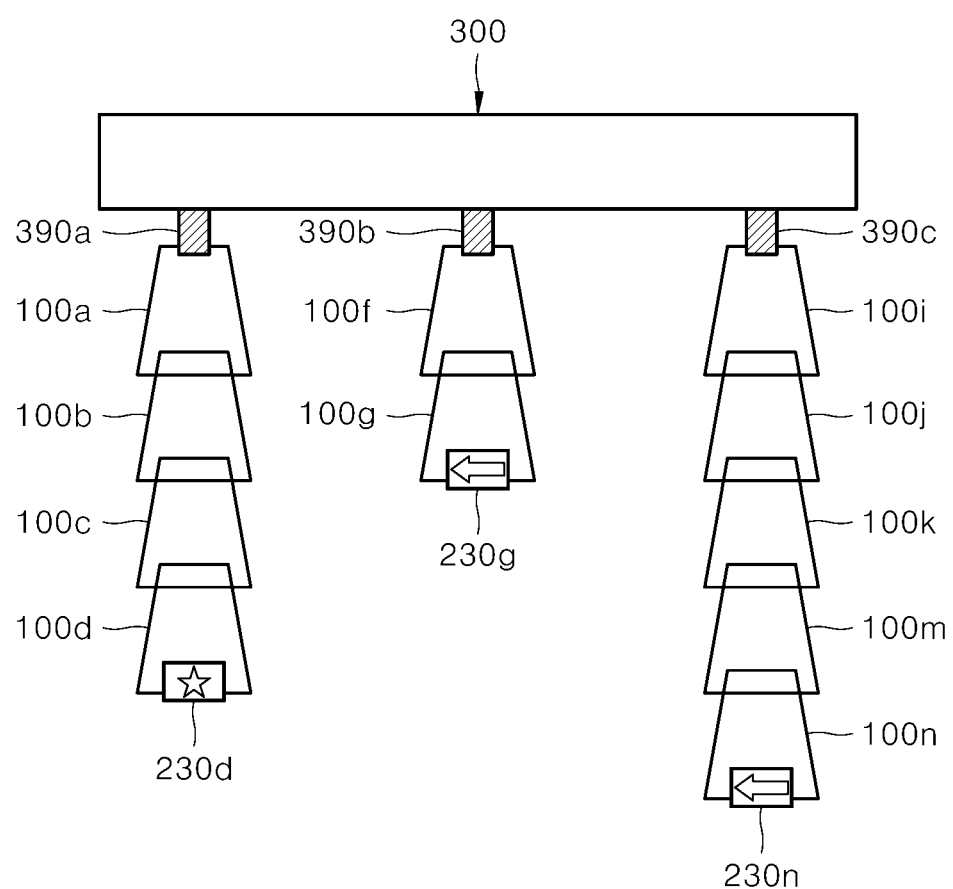

FIGS. 13 to 15 show an exemplary embodiment of information displayed by last carts in a plurality of charging rows.

When multiple carts form a plurality of charging rows, an interface 230 of the cart may output the current state of charging cart disposed in each of charging rows. Alternatively, the interface 230 of the cart may indicate a row, among a plurality of charging rows, in which charging is completed. Three rows of carts are disposed in the three power connectors 390a, 390b, and 390c of the power supply 300. Four carts 100a, 100b, 100c, and 100d disposed in the first charging row are connected to the first power connector 390a. Two carts 100f and 100g disposed in the second charging row are connected to the second power connector 390b. Five carts 100i, 100j, 100k, 100m, and 100n disposed in the third charging row are connected to the third power connector 390c.

The carts 100d, 100g, and 100n disposed at ends of the charging rows are first separated from the charging rows for use by the user. Therefore, according to one embodiment of the present disclosure, the interface 230 of each of the last carts 100d, 100g, and 100n may display a charging state or an available state of the last carts 100d, 100g, and 100n. For example, the last carts 100d, 100g, and 100n may include interfaces 230d, 230g, and 230n configured to output the current state of charge.

FIG. 14 shows interfaces of carts disposed in charging rows displaying current states of charging of carts. A last cart 100d disposed in a first row of FIG. 14 displays, on an interface 230d, a message indicating that charging is completed.

In some examples, a last cart 100g in a second row of FIG. 14 outputs, to an interface 230n, a message indicating that charging the last cart 100g in the second row is not completed, and the message indicate that the cart 100g may be used for 50 minutes.

Similarly, a last cart 100n of a third column in FIG. 14 also outputs, to an interface 230n, a message indicating that charging the last cart 100n is not completed and thus the last cart 100n may be used for 20 minutes.

Users may check messages output by carts to select the cart 100d that has completed the charging.

In some examples, in contrast to FIG. 14, the interfaces may indicate, to users, a row in which a lot of charging is performed. For example, as shown in FIG. 14, when the cart 100d in the first charging row is completely charged, interfaces in the charging rows may indicate the charging row including the cart 100d that has completed the charging by arrows.

FIG. 15 shows exemplary interfaces of carts in charging rows indicating a cart that has completed charging of carts. As shown in FIG. 15, as charging a last cart 100d in a first row is completed, an interface 230d displays a star shape.

By contrast, as charging a last cart 100g in a second row has not completed, an interface 230g outputs an arrow to indicate the first row in which charging the cart is completed.

Similarly, as charging the last cart 100n in the third row has not completed, an arrow is output to the interface 230n to indicate the first row in which charging the cart 100d has been completed.

Figure 16:
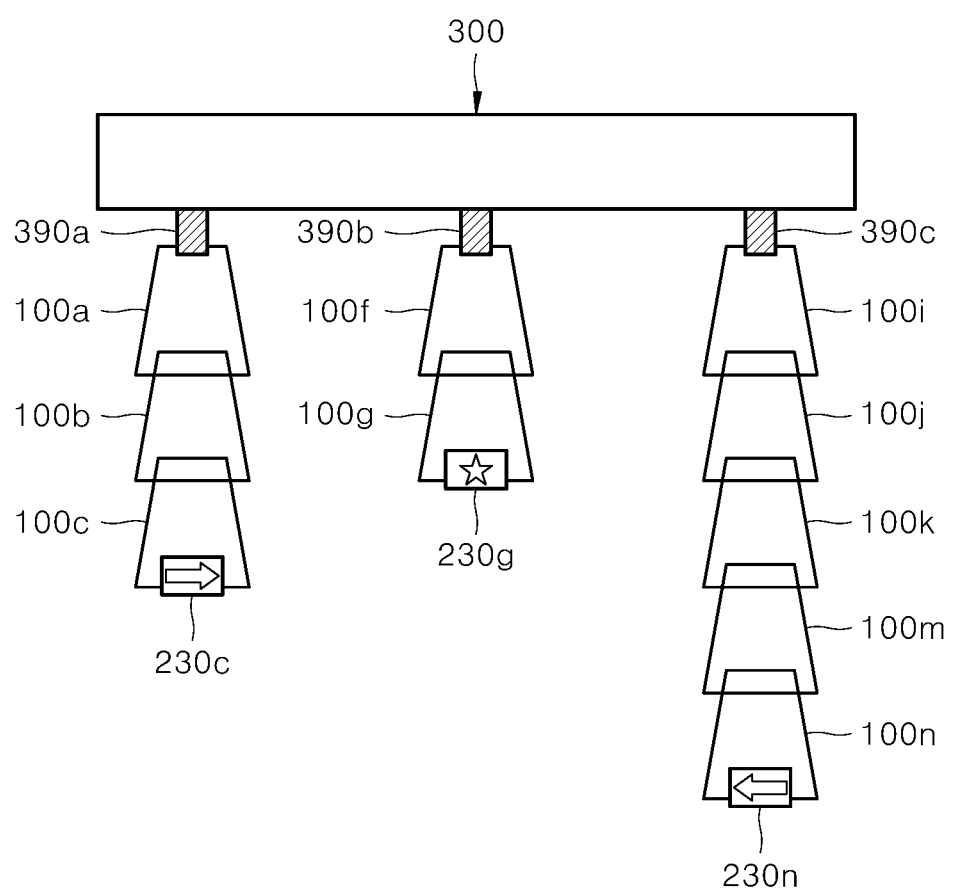
FIG. 16 shows exemplary interfaces of carts in charging rows indicating a specific charging row.

In the configuration of FIG. 15, when the user removes the last cart 100d in the first row from the first row to use the last cart 100d, the power supply device 300 monitors charging states of carts disposed at ends of rows and the power supply device 300 identifies a cart charged with a highest level. As shown in FIG. 16, interfaces of the last carts in charging rows indicate a charging row of a cart charged with the highest level. That is, the interfaces may display messages or images configured to indicate the charging row in which charging the cart is completed and to indicate the charging row in which the cart is charged with the highest level.

FIG. 16 shows examples of interfaces of carts of each of charging rows indicating a specific charging row.

FIG. 16 shows examples of interfaces of carts disposed in each of charging rows indicating a charging row (a second charging row) of a cart 100g which is charged with a highest level when the user uses the last cart 100d in the first charging row by separating, from the first charging row in FIG. 15. In the example of FIG. 15, when the last cart 100d in the first charging row is separated from the first charging row, the power supply device 300 monitors the charging state of the carts disposed at ends of rows. Subsequently, the power supply device 300 determines charging states of last carts 100c, 100g, and 100n in three rows and selects the last cart 100g in the second row. The selected cart has a greatest charging amount or is fully charged.

The power supply device 300 provides a message notifying that interfaces of carts in charging rows indicate the last cart 100g in the second row.

The interfaces 230c, 230g, 230n of the carts in charging rows output an image or a message to indicate the last cart 100g of the second charging row as shown in FIG. 16. This process is repeated even when new cart is connected to the one of charging rows.

Figure 17:
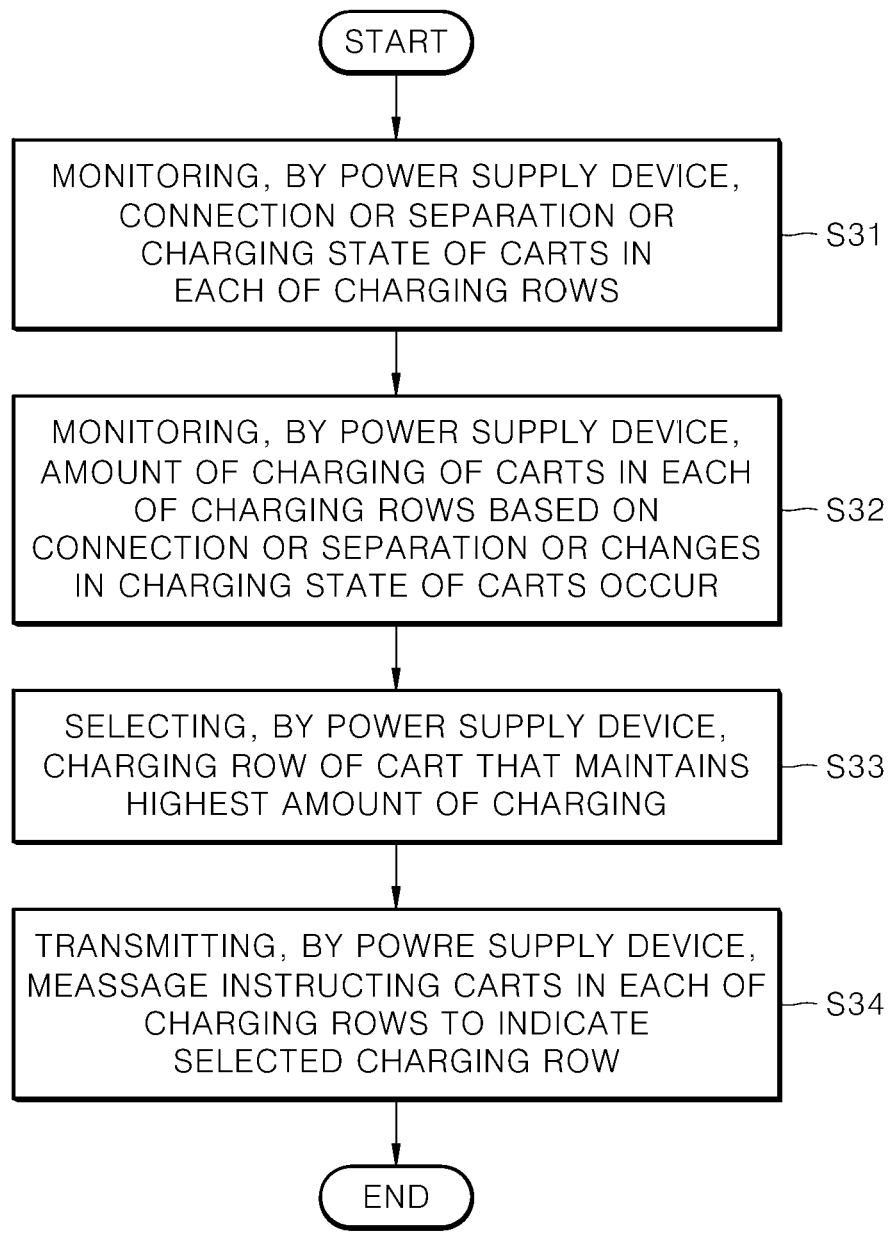
FIG. 17 shows an exemplary process of monitoring, by a power supply device, a state in which each of carts are disposed in charging rows and charging states of carts.

FIG. 17 shows an exemplary process of monitoring, by a power supply device, a state in which carts are coupled to carts in charging rows and charging states of carts.

A power supply device 300 monitors connection or separation or charging states of carts in each of charging rows (S31). For example, carts newly connected to a last cart in each of charging rows or carts separated from each of charging rows by users, or changed charging states of carts are monitored.

Based on the monitoring that the power supply device 300 determines that connection or detachment or charging state of carats has been changed, the power supply device 300 monitors the charging amount of the carts in each of charging rows (S32). Subsequently, the power supply device 300 selects the charging row of the cart that maintains the state of the highest charging amount (S33). In some examples, one or more charging rows may be selected in this process.

Subsequently, the power supply device 300 transmits a message requesting that carts in each of charging rows indicate the selected charging row (S34). As a result, the carts in each of charging rows may output, to the interface, a message or an image displaying the completion of charging of the cart or requesting that the carts in each of charging rows indicate adjacent another charging row.

In some examples, the power supply device 300 may recommend the user to use a cart in a particular charging row by reflecting a charging or connection state in which multiple carts are connected to a specific charging row or carts in a specific charging row are rapidly charged. To this end, the interfaces of carts may output whether carts are currently available or unavailable.

In summary of FIG. 17, the controller 350 of the power supply device 300 monitors connection or separation of a cart or changes in charging states of carts disposed in N numbers of charging rows connected to N numbers of power connectors 390. In some examples, the controller 350 of the power supply device 300 generates a message indicating that charging carts in M numbers of charging rows, among N numbers of charging rows, are completed. At this time, the number "M" is less than or equal to the number "N". The communicator 380 of the power supply device 300 sends a message to each of carts. The communicator 380 may transmit a message to all carts or to last carts in charging rows.

When exemplary embodiments of FIGS. 13 to 17 are applied, the user may identify carts that complete the charging or is charged with a higher level, thereby improving user convenience.

Although components included in the exemplary embodiment of the present disclosure are described as being combined to one, or as being coupled to operate, such exemplary embodiment is not necessarily limited to this specific example, and these components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The storage medium of the computer program may include a storage medium including a semiconductor recording element, an optical recording medium, a magnetic recording medium. Further, the computer program that implements the embodiment of the present disclosure may include a program module that is transmitted in real time through an external apparatus.

While the present disclosure has been mainly described referring to the exemplary embodiments of the present disclosure hereinabove, various modifications and changes can be made at the level of those skilled in the art. Therefore, unless such a modification and change do not deviate from the range of the present disclosure, it will understand that they are included in the scope of the present disclosure.

Other embodiments are within the scope of the following claims.

DESCRIPTION OF SYMBOLS

100: Cart
110: Accommodator
120: Handle assembly
150: Control portion
190: Mover
210: Charger
250: Controller
290: Power connector
300: Power supply device

What is claimed is:

1. A power supply device for supplying power to multiple carts, the power supply device comprising:
   a communicator that receives information on a charge demand from one or more electrically connected carts;
   a controller that calculates a charge allocation of the electrically connected carts based on priorities of the electrically connected carts; and
   a power supply that supplies power to a physically connected cart,
   wherein the communicator transmits, to the electrically connected carts, information on the charge allocation of the electrically connected carts, and
   wherein the controller calculates a number of carts capable of full charge (FULL_CHARGING_CART_NUM) based on an electric capacity of the power supply device and a battery capacity of the electrically connected carts, and when a number of uncharged carts is smaller than the FULL_CHARGING_CART_NUM, then the controller sets a maximum current amount for all uncharged carts without determining the priorities of the electrically connected carts.

2. The power supply device for supplying the power to the multiple carts of claim 1, wherein the controller determines the priorities of the electrically connected carts based on the charge demand of the electrically connected carts and calculates the charge allocation of the electrically connected carts.

3. The power supply device for supplying the power to the multiple carts of claim 1, wherein the controller determines the priorities of the electrically connected carts based on connection sequence information related to the electrically connected carts and calculates the charge allocation of the electrically connected carts.

4. The power supply device for supplying the power to the multiple carts of claim 3,
   wherein the controller increases and sets the connection sequence based on a sequence in which the electrically connected carts are connected to the power supply device, and
   wherein the controller increases the charge allocation to be supplied to an electrically connected cart as the electrically connected cart has a greater connection sequence to the power supply device.

5. The power supply device for supplying the power to the multiple carts of claim 1,
wherein a database stores identification information related to each of the electrically connected carts and a charging time of each of the electrically connected carts, and
wherein the controller determines the priorities of the electrically connected carts based on the charging time of each of the electrically connected carts and calculates the charge allocation of the electrically connected carts.

6. The power supply device for supplying the power to the multiple carts of claim 1,
wherein the controller calculates an expected charging time of each of the electrically connected carts based on the charge allocation to be allocated to each of the electrically connected carts, and
wherein the communicator transmits, to the electrically connected carts, information on the expected charging time.

7. The power supply device for supplying the power to the multiple carts of claim 1,
wherein the communicator receives a message requesting a rapid charging from any one of the electrically connected carts, and
wherein the controller changes the priorities of the electrically connected carts to allocate a maximum charge allocation to the cart that has sent the message.

8. The power supply device for supplying the power to the multiple carts of claim 1,
wherein the controller monitors a connection or a separation of the electrically connected carts or changes in a charging state of the electrically connected carts disposed in N numbers of charging rows connected to N numbers of power connectors, and
wherein the controller generates a message indicating that charging electrically connected carts in M numbers of charging rows, among the N numbers of charging rows, is completed and the communicator transmits the message to the electrically connected carts.

9. A method for supplying, by a power supply device, power to multiple carts, the method comprising:
receiving, by a communicator, charge demand information from one or more electrically connected carts;
calculating, by a controller, a charge allocation of the electrically connected carts based on priorities of the electrically connected carts;
transmitting, by the communicator, information on the charge allocation of each of the electrically connected carts to the electrically connected carts; and
supplying, by the power supply, power to a physically connected cart,
wherein the controller calculates a number of carts capable of full charge (FULL_CHARGING_CART_NUM) based on an electric capacity of the power supply device and a battery capacity of the electrically connected carts, and when a number of uncharged carts is smaller than the FULL_CHARGING_CART_NUM, then the controller sets a maximum current amount for all uncharged carts without determining the priorities of the electrically connected carts.

10. The method for supplying, by the power supply device, the power to the multiple carts of claim 9, wherein the calculating the charge allocation of the electrically connected carts further comprises determining, by the controller, the priorities of the electrically connected carts based on the charge demand of the electrically connected carts and calculating the charge allocation of the electrically connected carts.

11. The method for supplying, by the power supply device, the power to the multiple carts of claim 9, wherein the charge allocation of the electrically connected carts is calculated by determining, by the controller, the priorities of the electrically connected carts based on information on connection sequences of the electrically connected carts.

12. The method for supplying, by the power supply device, the power to the multiple carts of claim 11, the method further comprising:
increasing and setting, by the controller, the connection sequences of the electrically connected carts based on a sequence in which the electrically connected carts are connected to the power supply device; and
increasing, by the controller, the charge allocation to be supplied to an electrically connected cart as the electrically connected cart has a higher connection sequence with respect to the power supply device.

13. The method for supplying, by the power supply device, the power to the multiple carts of claim 9, the method further comprising:
storing, by a database, identification information related to each of the electrically connected carts and a charging time of each of the electrically connected carts; and
determining, by the controller, the priorities of the electrically connected carts based on the charging time of each of the electrically connected carts and calculating the charge allocation of the electrically connected carts.

14. The method for supplying, by the power supply device, the power to the multiple carts of claim 9, the method further comprising:
calculating, by the controller, an expected charging time of each of the electrically connected carts based on the charge allocation to be allocated to each of the electrically connected carts; and
transmitting, by the controller, information on the expected charging time to the electrically connected carts.

15. The method for supplying, by the power supply device, the power to the multiple carts of claim 9, the method further comprising:
monitoring, by the controller, a connection or a separation or changes in a charging state of the electrically connected carts in N numbers of charging rows connected to N numbers of power connectors;
generating, by the controller, a message indicating that charging electrically connected carts in M numbers of charging rows, among the N numbers of charging rows, is completed; and
transmitting, by the communicator, the message to the electrically connected carts.

16. The method for supplying, by the power supply device, the power to the multiple carts of claim 9, the method further comprising:
receiving, by the communicator, a message requesting a rapid charging from any one of the electrically connected carts; and
changing, by the controller, the priorities of the electrically connected carts to allocate a maximum charge allocation to the cart that has sent the message.

* * * * *